United States Patent Office 3,022,977
Patented Feb. 27, 1962

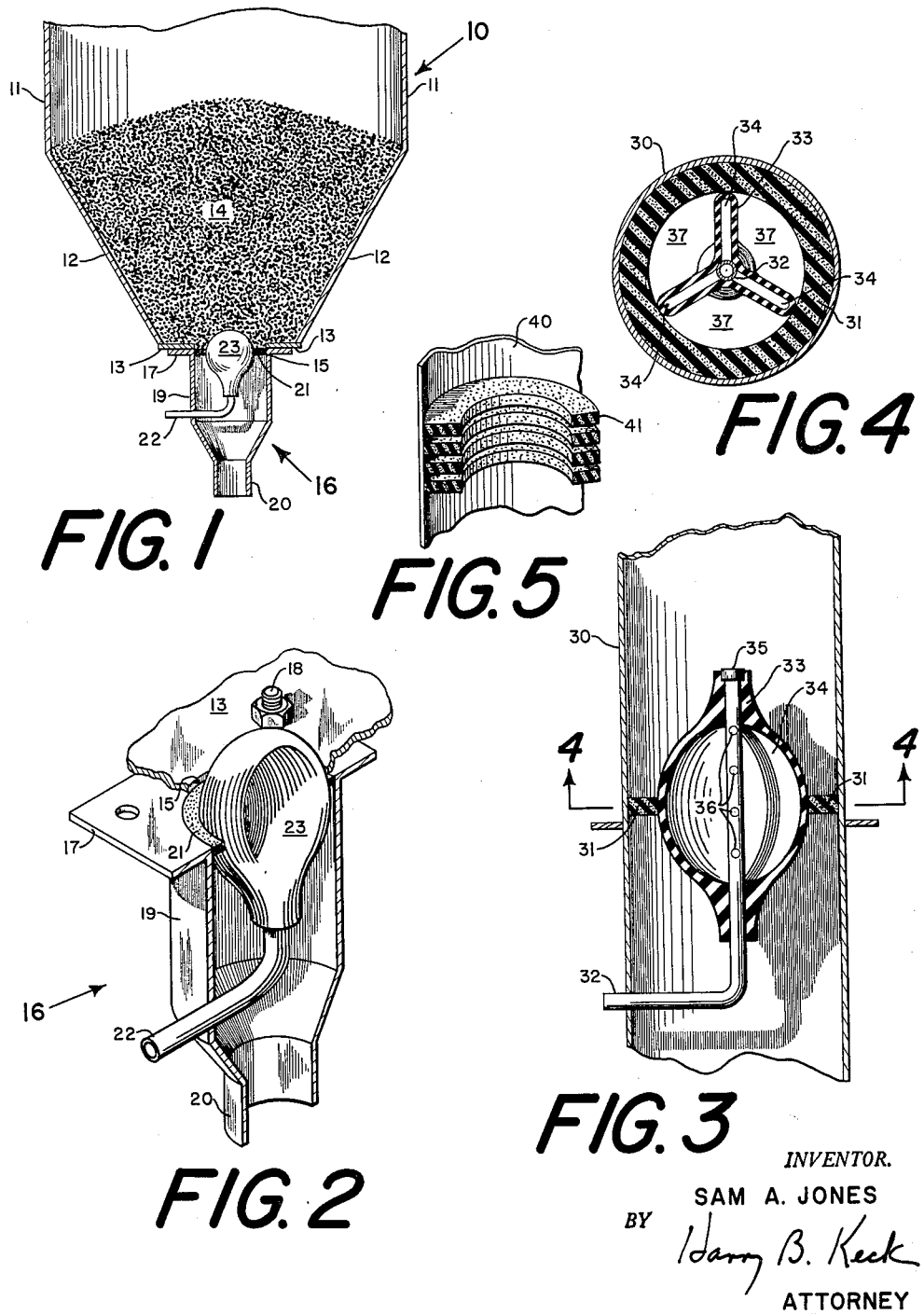

3,022,977
VACUUM OPERATED NORMALLY
CLOSED VALVE
Sam A. Jones, Pittsburgh, Pa.
(1503 Newport Ave., Lakeland, Fla.)
Filed Sept. 25, 1958, Ser. No. 763,243
4 Claims. (Cl. 251—61)

The present invention relates to a vauuum operated, normally closed valve. More particularly, it relates to a valve especially adapted to control the flow of solid particles through a conduit.

There are many situations where solid particles are transported intermittently through conduits. Two problems which occur in such situations are, first, interference with the valve closure created by entrapment of solid particles, and second, erosion of valve surfaces caused by the flow of solid particles therethrough.

The valve of the present invention avoids these problems and, in addition, possesses further desirable features. The present valve is remotely controllable. It is quick acting in both opening and closing. It is inexpensive to construct and maintain. It is radily replaceable. It can be installed quickly and easily in an existing pipe without requiring expensive fittings or supporting structure.

The principal object of the present invention is to provide a vacuum operated, normally closed valve.

A further object is to provide a valve which can be installed in an existing pipe without requiring expensive supporting structure.

A still further object is to provide a remotely controllable valve which can be readily replaced and which is inexpensive to construct and install.

These and other objects and advantages of the present invention will become apparent from the following detailed description by reference to the acompanying drawings in which:

FIGURE 1 is a cross-section illustration of the valve of the present invention serving to control the flow of solid particles downwardly from a container bin;

FIGURE 2 is fragmentary perspective illustration of the valve shown in FIGURE 1 in an open condition;

FIGURE 3 is a cross-section illustration of alternative embodiment of the vacuum operated, normally closed valve of this invention;

FIGURE 4 is a plan view cross-section of the alternative embodiment shown in FIGURE 3 in an open condition; and FIGURE 5 is a fragmentary perspective view of an alternative construction of one element of the present invention.

Referring to FIGURE 1, a container bin 10 is illustrated having vertical sidewalls 11, sloping sidewalls 12 and a bottom wall 13. The container bin 10 is adapted to confine an inventory 14 of solid particles. An aperture 15 is provided in the bottom wall 13 to provide a discharge opening for withdrawal of the solid particles from the inventory 14. A valve 16, according to the present invention, controls the flow of solid particles through the aperture 15.

The valve 16, also illustrated in FIGURE 2, comprises a cylindrical valve casing 19 which tapers to a discharge connection 20. The upper portion of the valve casing 19 may be flanged to form a horizontal upper plate 17 which may be secured to the bottom wall 13 by means of bolts 18. Extending radially inwardly from the upper lip of the valve casing 19 is a peripheral lining 21 of resilient deformable sealing material such as foam rubber, sponge rubber and the like.

An L-shaped rigid tube 22 extends horizontally through the wall of the valve casing 19 and vertically upward at the center thereof. Mounted on the upper end of the rigid tube 22 is resilient collapsible bulb 23 of rubber or plastic or like materials having a normally circular outer surface which engages the lining 21 of resilient deformable sealing material.

Application of reduced pressures to the rigid tube 22 and the inner portion of the collapsible bulb 23, causes the collapsible bulb 23 to collapse in the configuration illustrated in FIGURE 2 whereby the collapsible bulb 23 withdraws from the lining 21 of sealing material to provide a channel therebetween for the passage of solid particles into the valve chamber 19 and through the discharge tube connection 20.

Upon restoration of atmospheric pressure within the rigid tube 22, the collapsible bulb 23 expands outwardly to its normally circular outer configuration in contact with the resilient lining 21. Should any particles of solids be trapped between the collapsible bulb 23 and the resilient lining 21 during the instant of expansion of the collapsible bulb 23, such particles will depress into the resilient lining 21 but will not interfere with a complete closure of the valve 16.

The hollow fluid chamber of the collapsible bulb 23 may be filled with or emptied of a liquid or a gas instead of atmospheric air as already described. The use of pressurized liquids or pressurized gases permits use of the present valve in flow situations involving slightly elevated pressures in the flowing materials.

The only moving parts in the present valve include the resilient collapsible bulb 23 and the lining 21 of resilient deformable material. The collapsible bulb 23 merely collapses and expands with each valve opening and closing. The lining 21 of resilient deformable material is subjected to a slight compression from the expanded collapsible bulb 23 when the valve is in its normal closed position. The lining 21 of the resilient material is relaxed, i.e., uncompressed, during those periods when the valve is in its open position. The collapsible bulb 23 may be secured to the end of the rigid tube 22 so that the rigid tube 22 penetrates only into the base portion thereof or entirely into the hollow chamber thereof.

The normal outer diameter of the collapsible bulb 23 is less than the inner diameter of the valve casing 19. The lining 21 of resilient deformable material has an outer diameter corresponding to that of the valve casing 19 to which it is secured and has an inner diameter which is less than the normal outer diameter of the collapsible bulb 23 which it encompasses. The lining 21 is more readily deformable than the resilient bulb 23.

Collapsible bulbs with a single opening, as shown in FIGURES 1 and 2, are readily available. Suitable collapsible bulbs, for example, are used as manual syringes, for example in hydrometric devices.

An alternative embodiment of the present invention is illustrated in FIGURES 3 and 4. The alternative embodiment employs a collapsible bulb of the double opening type. This construction introduces added rigidity into the valve assembly. The valve illustrated in FIGURES 3 and 4 is shown in assembled position in a pipe 30 through which the solid particles may be moving in either direction, up or down. The pipe 30 has provided therein a lining 31 of resilient material such as foam rubber, sponge rubber and the like, at some position where flow control is desired. The lining 31 of resilient deformable material may be cemented to the inner wall of the pipe 30 as shown in FIGURE 3. If desired, more elaborate mounting techniques may be employed.

Extending through the wall of the pipe 30 is an L-shaped rigid tube 32 which extends along one side coaxially with the pipe 30. A double opening collapsible bulb 33 having an inner chamber 34 is fitted over the coaxial portion of the L-shaped rigid tube 32. A plug 35 or any convenient sealing device is provided to seal off the extreme inner portion of the L-shaped rigid tube 32. A plurality of openings 36 are provided in the coaxial portion of the L-shaped rigid tube 32 to coincide with the inner chamber 34 of the double opening collapsible bulb 33.

As shown in FIGURE 3, the portion of the L-shaped rigid tube 32 extending externally of the pipe 30 is in communication with the atmosphere. So long as atmospheric or substantially atmospheric pressure exists internally of the pipe 30, the double opening collapsible bulb 33 will maintain the position shown in FIGURE 3, i.e., outwardly expanded in compressive engagement with the lining 31 of resilient material. In this position, there is no opening for the flow of solid particles in either direction past the lining 31 of resilient material.

When the pressure within the chamber 34 is reduced by exhausting the gases through the L-shaped rigid tube 32 to a value below that existing in the pipe 30, the double opening collapsible bulb 33 will contract. This can be readily accomplished by connecting the external portion of the L-shaped rigid tube 32 to a vacuum source where atmospheric pressure exists within the pipe 30.

The collapse of the double opening collapsible bulb 33 normally occurs in a three-way configuration as illustrated in cross-section in FIGURE 4, i.e., along three planes separated by about 120 angular degrees. In this configuration, the double opening collapsible bulb 33 is under a minimum stress.

In the collapsed condition illustrated in FIGURE 4, three passageways 37 are presented for the passage therethrough of solid particles.

In the valve illustrated in FIGURES 1 through 4 hereof, the linings 21 and 31 of resilient deformable material are shown as having a length which is small in relation to the length of the resilient collapsible bulbs 23 and 33. It is within the scope of this invention to provide a lining of resilient deformable material which extends over the inner wall of the pipe or valve casing for a distance which exceeds the length of the collapsible bulbs 23 and 33.

In place of the porous materials, such as foam rubber or sponge rubber for the linings 21 and 31, it is possible to provide a resilient deformable lining for use with the present valve constructed of a plurality of flat rings of porous or non-porous deformable material such as rubber or plastic. Such a construction is illustrated in FIGURE 5 where a valve casing 40 has a plurality of flat rubber rings 41 secured thereto. The central portion of a collapsible bulb for use therewith would, in normal relaxed conditions, depress one or more of the rings 41.

According to the provisions of the patent statutes, I have explained the principle, preferred construction, and mode of operation of my invention and have illustrated and described what I consider to represent its best embodiment. However, I desire to have it understood that, within the scope of the appended claims, the invention may be practiced otherwise than as specifically illustrated and described.

I claim:

1. A vacuum-operated, normally closed valve comprising a pipe section, a lining of resilient, deformable material over the inner wall thereof, a hollow resilient collapsible bulb having a circular cross-section of slightly greater normal diameter than the inner diameter of said lining, thereby maintaining said bulb in normally compressive engagement with said lining, a rigid tube extending from and communicating with the hollow portion of said collapsible bulb and through a wall of said pipe section thereby securing said collapsible bulb against longitudinal movement in said pipe section, and means for connecting the external portion of said rigid tube to a vacuum source for exhausting fluids from said rigid tube and from the hollow portion of said collapsible bulb to cause collapse of said collapsible bulb whereby its outer surface separates from compressive engagement with said lining to provide a flow passageway therebetween.

2. A vacuum-operated, normally closed valve comprising a pipe section, a lining of resilient, deformable material over the inner wall thereof, a hollow resilient collapsible bulb having an axial opening at each end and a maximum cross-section at a central portion thereof which central portion is of slightly greater normal diameter than the inner diameter of said lining, thereby maintaining said bulb in normally compressive engagement with said lining, a rigid tube extending between said axial openings of said collapsible bulb and through a wall of said pipe section thereby securing said collapsible bulb against longitudinal movement in said pipe section, perforations in said rigid tube between said axial openings to provide communication between the hollow portion of said collapsible bulb and the inner portion of said rigid tube, and means for connecting the external portion of said rigid tube to a vacuum source for exhausting fluids from said rigid tube and from the hollow portion of said collapsible bulb to cause collapse of said collapsible bulb whereby its outer surface separates from compressive engagement with said lining to provide a flow passageway therebetween.

3. A vacuum-operated, normally closed valve comprising a pipe section, a lining of resilient, distortable material, having a normal outer diameter corresponding to that of said pipe section and a normal inner diameter less than that of said pipe section, a hollow resilient collapsible bulb having a circular cross-section maintained in normally compressive engagement with said lining, said bulb having a normal maximum diameter greater than the normal inner diameter of said lining, a rigid tube extending from and communicating with the hollow portion of said collapsible bulb and through a wall of said pipe section thereby securing said collapsible bulb against longitudinal movement in said pipe section, and means for connecting the external portion of said rigid tube to a vacuum source for exhausting fluids from said rigid tube and from the hollow portion of said collapsible bulb to cause collapse of said collapsible bulb whereby its outer surface separates from compressive engagement with said lining to provide a flow passageway therebetween.

4. A vacuum-operated, normally closed valve comprising a pipe section through which fluids flow in one direction, a lining of resilient, deformable material over the inner wall thereof, a hollow resilient collapsible bulb having a circular cross-section of slightly greater diameter than the inner diameter of said lining, thereby maintaining said bulb in normally compressive engagement with said lining, a rigid tube extending axially within said pipe section in the direction from which fluids flow therethrough, said rigid tube further extending from and communicating with the hollow portion of said collapsible bulb and through a wall of said pipe section thereby securing said collapsible bulb against longitudinal movement in said pipe section, and means for connecting the external portion of said rigid tube to a vacuum source for exhausting fluids from said rigid tube and from the hollow portion of said collapsible bulb to cause collapse of said collapsible bulb whereby its outer surface separates from compressive engagement with said lining to provide a flow passageway therethrough.

References Cited in the file of this patent

UNITED STATES PATENTS

| | | |
|---|---|---|
| 1,873,138 | Mitchell | Aug. 23, 1932 |
| 2,336,450 | Voorhess | Dec. 7, 1943 |
| 2,627,874 | Johnson | Feb. 10, 1953 |
| 2,633,154 | Eastman | Mar. 31, 1953 |
| 2,687,145 | Carter | Aug. 24, 1954 |

FOREIGN PATENTS

| | | |
|---|---|---|
| 258,092 | Switzerland | Apr. 16, 1949 |